United States Patent [19]

Murakami

[11] Patent Number: 4,575,857
[45] Date of Patent: Mar. 11, 1986

[54] ADAPTIVE EQUALIZER WITH VARIABLE TAP COEFFICIENT LEAKAGE

[75] Inventor: Junzo Murakami, Kawasaki, Japan

[73] Assignee: Kabushiki Kaisha Toshiba, Kawasaki, Japan

[21] Appl. No.: 608,099

[22] Filed: May 8, 1984

[30] Foreign Application Priority Data

May 17, 1983 [JP] Japan .................................. 58-86052

[51] Int. Cl.$^4$ ............................................. H04B 3/04
[52] U.S. Cl. ........................................ 375/12; 375/14; 358/905; 333/18
[58] Field of Search ........................ 375/12, 13, 14, 15, 375/16; 358/167, 905; 364/724, 825; 333/18

[56] References Cited

U.S. PATENT DOCUMENTS 3,868,603  2/1975  Guidoux .............................. 375/15
4,127,874  11/1978 Iwasawa et al. ................... 358/167
4,467,441  8/1984  Gritton ............................... 364/724

FOREIGN PATENT DOCUMENTS 57-185727  11/1982  Japan .

OTHER PUBLICATIONS

IEEE Transactions on Consumer Electronics, vol. CE-28, No. 3, Aug. 1982, pp. 447-452, M. Obara et al.

Primary Examiner—Robert L. Griffin
Assistant Examiner—Raymond C. Glenny
Attorney, Agent, or Firm—Oblon, Fisher, Spivak, McClelland & Maier

[57] ABSTRACT

An automatic equalizer comprises a waveform equalizer having a transversal filter connected to receive an input signal having a linear distortion, and having controllable tap gains; and a tap gain correcting means for successively correcting the tap gains of the transversal filter to take from the transversal filter an output signal from which the linear distortion is removed. In order to maintain the good convergency of tap gain correction control and prevent the excessive increase of the residual distortion, the tap gain correcting means is arranged to add a small leak to the correction control of tap gains. The magnitude of this leak is increased or decreased depending upon the sum of absolute values of the differences between the tap gains and their predetermined values to be set when the input signal contains no distortion.

3 Claims, 2 Drawing Figures

ADAPTIVE EQUALIZER WITH VARIABLE TAP COEFFICIENT LEAKAGE

BACKGROUND OF THE INVENTION

The present invention relates to an equalizer for equalizing the waveform of a received signal with a transversal filter having variable tap gains and, more particularly, to an automatic equalizer for automatically removing linear distortions caused in a transmission system by using a waveform of a predetermined shape which is periodically present in the received signal.

The automatic equalizer may be applied to a ghost canceller of a television receiver set. FIG. 1 shows a known ghost canceller using a transversal filter whose tap gains are variable. The leading edge of the first vertical synchronizing pulse in the vertical blanking period of a video signal is used as a reference signal for ghost detection ("Digitized Automatic Ghost Canceller" by Murakami et al; Electronic Communication Committee Technical Research Report EMC J 78-37, November, 1978).

In FIG. 1, reference numeral 20 represents the transversal filter whose tap gains are variable and which comprises a tapped delay line 21, weighting circuits 22, and an adder circuit 23. The delay time T between adjacent taps of tapped delay line 21 is selected to have a value smaller than the reciprocal of two times the highest frequency of the input video signal, e.g. 0.1 $\mu$S. The total number of taps depends upon the range of delay (or lead) time of the ghost to be cancelled. Providing that the total number of taps is 100, a time range of 10 $\mu$S can be covered.

A tap set to have a maximum weighting value (tap gain) is called the main tap. Taps whose delay time is shorter than that of the main tap are called forward taps, while taps whose delay time is longer are called backward taps. Providing that the 20th tap of 100 taps is selected as the main tap, up-to-2 $\mu$S leading ghosts and up-to-8 $\mu$S delayed ghosts can be cancelled out. The weighting circuit 22 connected to each of taps is a multiplier whose multiplying coefficient denotes the tap gain. It is assumed that the tap gain of the main tap is represented by $c_0$, the tap gains of the forward taps are represented by $c_{-M}-c_{-1}$, and the tap gains of the backward taps are represented by $c_1-c_N$. $c_0$ has a value of about 1 usually, and the values of the other tap gains $c_i$ ($i=-M-N$) are smaller than $c_0$ in absolute value.

With such a transversal filter, a ghost component (including a waveform distortion caused by a filter or the like) which is present at an input terminal 10 can be substantially cancelled out at an output terminal 30 if the tap gains $\{c_i\}$ (a series of $c_{-M}-c_0-c_N$) are set to have respective appropriate values. The automatic control of the tap gains to minimize the ghost component at the output may be performed as follows.

An input video signal applied to input terminal 10 is supplied to an input waveform memory 41 through a differentiation circuit 40. This input waveform memory 41 extracts and stores, under the control of a timing circuit 44 responsive to the input video signal, only the signal component having a predetermined length of the leading edge of the vertical synchronizing pulse adapted to detect ghost component.

A reference waveform generator circuit 45 is provided which responds to timing circuit 44 to generate a distortion-free reference waveform of the signal component at the leading edge of the vertical synchronizing pulse. An output video signal of output terminal 30 is applied to a subtracter circuit 43 through a differentiation circuit 42. This subtracter circuit 43 provides the difference between output signals of differentiation circuit 42 and reference waveform generator circuit 45. The difference signal is applied to an error waveform memory 46 which is responsive to timing circuit 44 to extract an error (distortion) waveform of the signal component at the leading edge of the vertical synchronizing pulse from the output signal of subtractor circuit 43, and memorize the error waveform.

The waveform thus memorized in input waveform memory 41 is represented by $\{x_k\}$ as a series of sampled values at an interval of 0.1 $\mu$S equal to the tap interval of transversal filter 20. Similarly, the output waveform of differentiation circuit 42 is represented by $\{y_k\}$; the reference waveform generated by reference waveform generator circuit 45 is represented by $\{r_k\}$; and the error waveform from subtractor circuit 43 is represented by $\{e_k\}$ ($e_k = Y_k - r_k$).

$\{x_{k-i}\}$ and $\{e_k\}$ are read out from respective memories 41 and 46 by a clock signal to perform a correlation operation represented by $$d_i = \sum_{k=P}^{Q} x_{k-i} e_k \tag{1}$$

The correlation range [P, Q] is usually taken from P = −2M to Q = 2N. The physical meaning of $d_i$ represents the approximate magnitude of a ghost with a delay time $iT$ (T is the tap interval).

The tap gain $\{c_i\}$ is stored in a tap gain memory 48. The initial values of tap gains are: $c_0=1$; $c_{-M} \sim c_{-1}=0$; and $c_1 \sim c_N=0$. Every time the operation of equation (1) is finished with respect to i (−M∼N) the tap gain $c_i$ is read out from tap gain memory 48, and is subjected to a correction, which is represented by:

$$c_{i,\,new} = c_{i,\,old} - ad_i \tag{2}$$

wherein a has a small positive value. After the correction, the tap gain is rewritten in tap gain memory 48. The operations represented by equations (1) and (2) are conducted during one field period with respect to all taps by a tap gain correction circuit 47.

The operations are repeated every time the reference waveform is received (or once per one field).

As a result, the error waveform $\{e_k\}$ gradually approaches 0. Namely, the output waveform $\{y_k\}$ approaches the reference waveform $\{r_k\}$. $\{c_i\}$ is finally converged to have a value $\{c_i\}_{opt}$, and the output waveform $\{y_k\}$ is corrected to have the smallest margin of error, as defined by:

$$E = \sum_{k=P}^{Q} (y_k - r_k)^2 \tag{3}$$

(see the above-cited literature).

When tap gain correction is repeated using equations (1) and (2), the tap gain value is converged to have $\{c_i\}_{opt}$ in principle. Because the frequency response of transversal filter 20 is not ideal, the tap gain value is not necessarily actually converged to $\{c_i\}_{opt}$. $\{c_i\}$ changes toward $\{c_i\}_{opt}$ for a certain initial time period after the start of successive correction control, but as time passes, it happens that $\{c_i\}$ diverges gradually.

There is also known a method of correcting tap gain by:

$$c_{i,\,new} = c_{i,\,old} - a\,e_i \quad (4)$$

instead of by equations (1) and (2) to simplify the tap gain correction circuit. This is called the zero-forcing method. In the zero-forcing method, $\{c_i\}$ may diverge in principle depending upon the shape of the input waveform $\{x_k\}$, even if the frequency response to transversal filter is ideal.

For the purpose of avoiding the above-mentioned divergence of the tap gain correction control, the following modification of equation (2) (similarly in the case of equation (4)) is carried out so as to provide a small leak to the tap gain correction control:

$$\left. \begin{array}{l} c_{i,new} = (1 - \beta)c_{i,old} - a\,d_i\,(i \neq 0) \\ c_{0,new} = 1 + (1 - \beta)(c_{0,old} - 1) - a\,d_0 \end{array} \right\} \quad (5)$$

or $$\left. \begin{array}{l} c_{1,new} = c_{i,old} - l\operatorname{sgn} c_i - a\,d_i\,(i \neq 0) \\ c_{0,new} = c_{0,old} - l\operatorname{sgn}(c_0 - 1) - a\,d_0 \end{array} \right\} \quad (6)$$

wherein $\beta$ and $l$ represent small positive values for the leak, and sgn $c_i$ represents the sign of $c_i$ having a value of $-1$, $0$ or $+1$. In the case of equation (5), a leak proportional to $c_i$ is provided, and a constant value of the leak, regardless of $c_i$, is provided in the case of equation (6).

As described above, the method of avoiding the divergence by providing a leak to the tap gain correction control is already known, but it has the following problem.

As the leak ($\beta$ in equation (5) or $l$ in equation (6)) becomes larger and larger, the tap gain $\{c_i\}$ is strongly pulled back to 0 thereby preventing $\{c_i\}$ from growing as a whole. In other words, the divergence of $\{c_i\}$ can be avoided. However, this means that $\{c_i\}$ can never reach $\{c_i\}_{opt}$. In the case of equation (5), the converged value $\{c_i\}_\infty$ of $\{c_i\}$ is given by $$\{c_i\}_\infty \approx \left(1 - \frac{\beta}{a}\right)\{c_i\}_{opt} \quad (7)$$

Because $\{c_i\}_\infty$ cannot reach $\{c_i\}_{opt}$, the residual distortion at the output of the automatic equalizer (or the remaining ghost in the case of the ghost canceller) increases naturally. The leak must be made as small as possible to reduce the residual distortion to the greatest extent, but the control diverges when the leak is too small. The value of leak enough to avoid the divergence depends upon the magnitude of a distortion in an input signal. Therefore, the value of leak must be previously set relatively large enough to meet any input signal. As a result, a leak larger than is needed would be added when the distortion of input signal is small so that the distortion cannot be reduced to a desirable extent. A system of adding a constant leak when the sum of the absolute values of the tap gains exceeds a certain value is also disclosed in Japanese laid-open patent application No. 57/185727, but it cannot add an optimum leak to meet any distortion in the input signal.

SUMMARY OF THE INVENTION

An object of the present invention is to provide an improved automatic equalizer.

Another object of the present invention is to provide an automatic equalizer capable of preventing the divergence of the tap gain control of a transversal filter, and of reducing a residual distortion at the output thereof.

A further object of the present invention is to provide an automatic equalizer arranged to usually provide to the tap gain control a leak of the smallest magnitude necessary to maintain the convergency of tap gain correction control, in accordance with the present tap gains of the transversal filter.

An automatic equalizer of the present invention includes a waveform equalizer having a transversal filter connected to receive an input signal in which a waveform with a predetermined shape is periodically present, and having a plurality of taps whose gains can be controlled; and a tap gain correction means for successively correcting each of the tap gains of the transversal filter in such a way that an output waveform of the waveform equalizer, which corresponds to the waveform present in the input signal, approaches a predetermined reference waveform. The tap gain correction means is arranged to provide a leak to the tap gain control so that each of the tap gains of the transversal filter approaches its desired value.

According to the present invention, in order to achieve the above objects, the tap gain correction means is arranged to find the sum of absolute values of the differences between the present tap gains of a plurality of taps and predetermined tap gains of the corresponding taps, which are to be set when an input signal contains no distortion, and to vary the magnitude of the leak to be provided to the control of each of the tap gains in accordance with the sum of absolute values.

According to the present invention, the convergency of tap gain control can be made better without excessive increase of the remaining distortion due to the leak, irrespective of the magnitude of distortion of the input signal.

DETAILED DESCRIPTION OF THE PREFERRED EMBODIMENT

Figure 1:
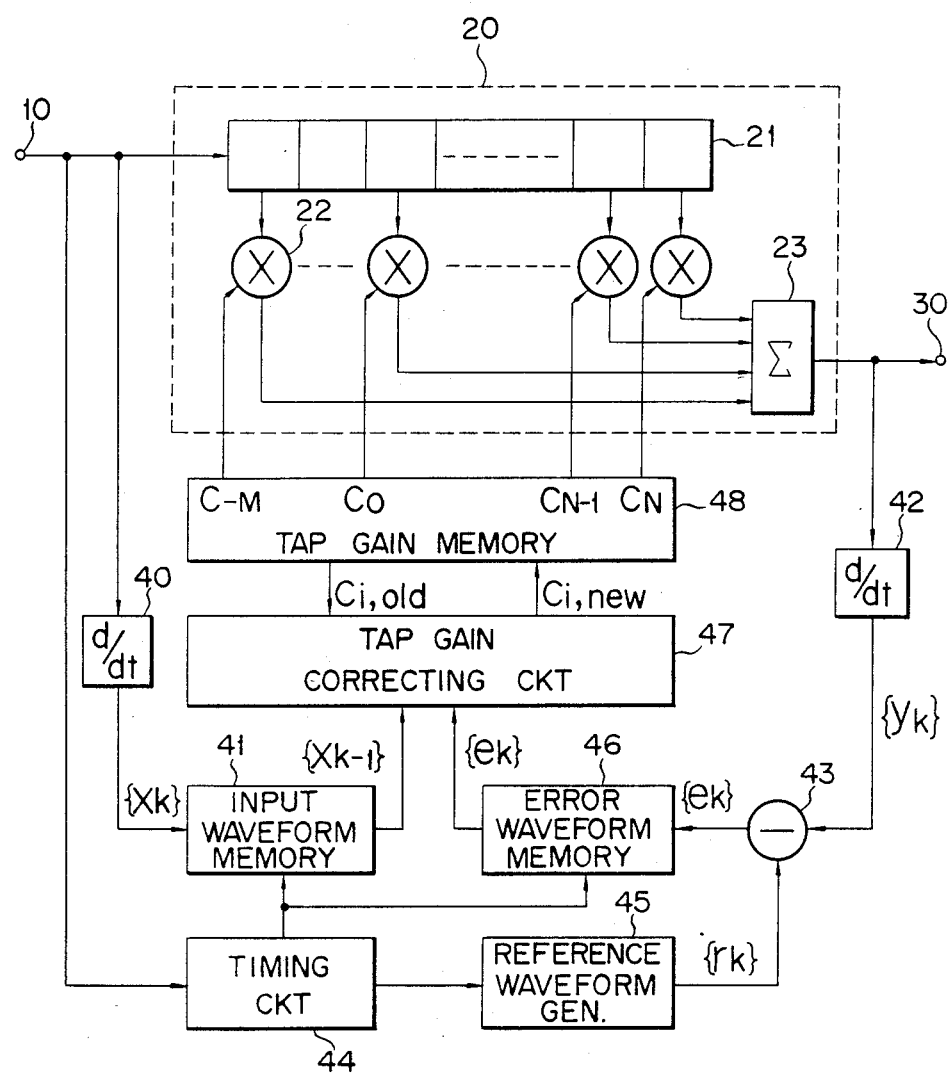
FIG. 1 shows a prior art automatic equalizer.
Figure 2:
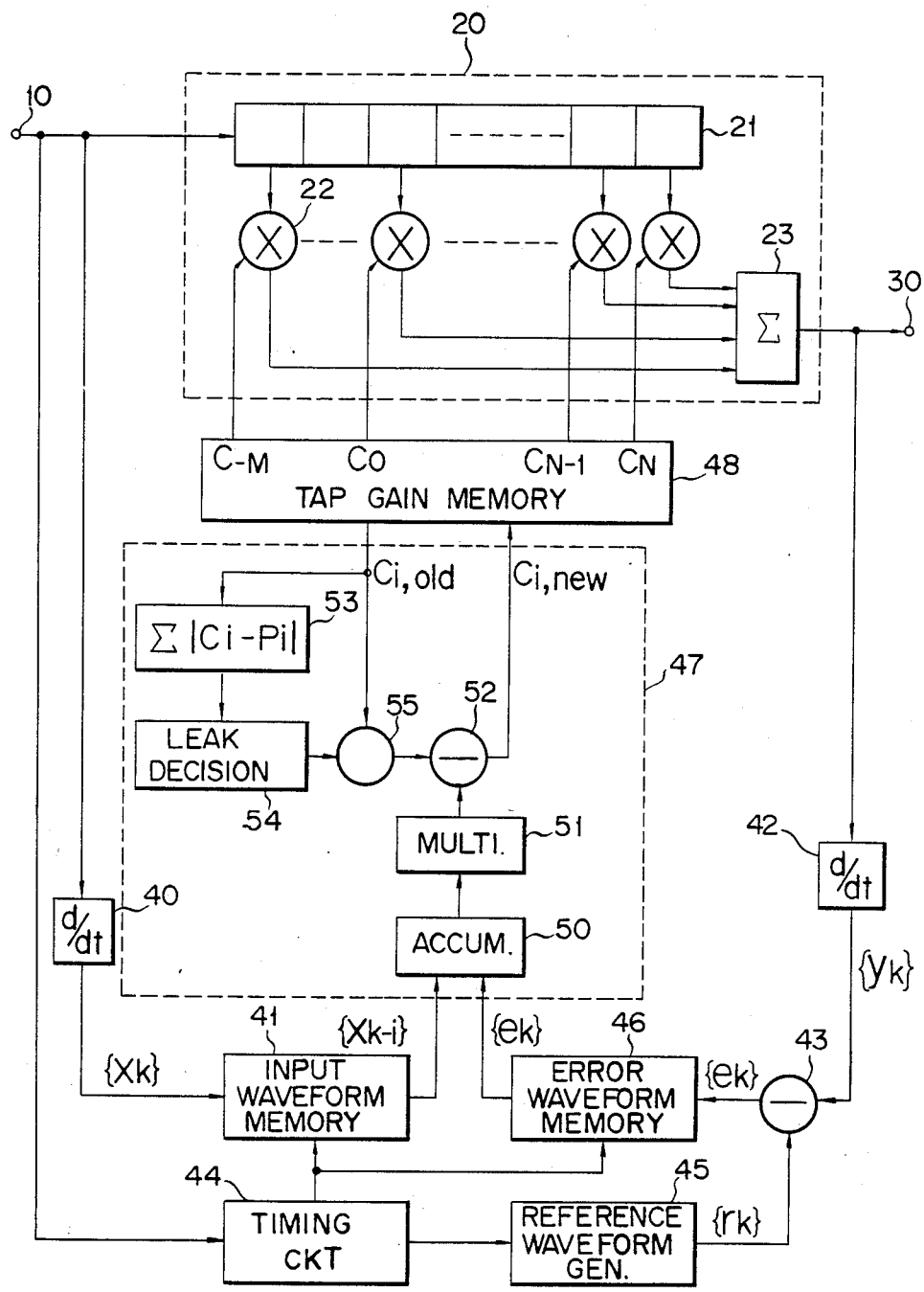
FIG. 2 shows an automatic equalizer embodying the present invention.

Referring now to FIG. 2 an automatic equalizer embodying present invention is substantially similar to that of FIG. 1 except for tap gain correcting circuit 47. The tap gain correcting circuit 47 will be therefore described in detail.

In tap gain correcting circuit 47, after all the tap gains $\{c_i\}$ ($i = -M \sim N$) have been read out once from tap gain memory 48, the following calculation is done by an absolute-value summing circuit 53:

$$A = \sum_{i=-M}^{N} |c_i| + |c_0 - 1| \quad (8)$$

The desired tap gains set when the input waveform contains no distortion are:

$$c_0 = 1 \quad c_i\,(i \neq 0) = 0 \quad (9)$$

Equation (8) therefore means the sum of the absolute values of the differences between $\{c_i\}$ and corresponding desired tap gains. Providing that the present gain of tap $T_i$ is $c_i$, and that an optimum gain of tap $T_i$ when the input signal has no distortion is $p_i$, equation (8) can be expressed as follows:

$$A = \sum_{i=-M}^{N} |c_i - p_i|$$

A leak decision circuit 54 decides the value of $\beta$ in equation (5) or of $l$ in equation (6) in accordance with the output A of absolute-value summing circuit 53. A method of deciding the value of $\beta$ or $l$ comprises the steps of previously setting a reference value $A_0$ as the value of A, and increasing the value of $\beta$ or $l$ in proportion to $(A-A_0)$ when A exceeds $A_0$. If $\beta$ is formulated, $$\left. \begin{array}{l} \text{when } A < A_0, \beta = \beta_0 \\ \text{when } A \geq A_0, \beta = \eta(A - A_0) + \beta_0 \end{array} \right\} \quad (10)$$

$l$ may be also decided similarly.

Another method of deciding the value of $\beta$ or $l$ comprises setting a plurality of reference values for A and increasing the value of $\beta$ or $l$ by one step every time A exceeds any one of the reference values.

The leak decision circuit 54 can be formed of a read only memory (ROM) which stores a data table. This ROM is accessed by the output A of absolute-value summing circuit 53 to read out a previously calculated value $\beta$ or $l$ according to the value of A.

As described above, the value of $\beta$ or $l$ is decided according to the value of A in leak decision circuit 54. When $\beta$ or $l$ is decided, the tap gains $\{c_i\}$ are successively read out from tap gain memory 48, and a leak is added by means of a leak adding circuit 55, which performs an arithmetic operation of: in the case of equation (5), (i) multiplying $c_i$ by $(1-\beta)$ when $i \neq 0$; and (ii) multiplying $c_0$ by $(1-\beta)$ and then adding $\beta$ when $i=0$; and, in the case of equation (6), (i) subtracting $l\text{sgn } c_i$ from $c_i$ when $i \neq 0$, and (ii) subtracting $l\text{sgn } (c_0-1)$ from $c_0$ when $i=0$.

On the other hand, a multiplier-accumulator 50 reads out $\{x_k\}$ from input waveform memory 41 and $\{e_k\}$ from error waveform memory 46, and performs the correlation operation expressed by equation (1) to provide $d_i$. Output $ad_i$ of the coefficient-multiplying circuit 51 is subtracted from the output of leak adding circuit 55 by a difference circuit 52 to provide a new corrected tap gain $c_{i, \text{new}}$ which is again returned to the tap gain memory 48.

As seen in equation (7), increasing the leak $\beta$ is the same as decreasing the proportional constant a. Therefore, changing the magnitude of leak includes a case of changing the value of coefficient a while keeping $\beta$ or $l$ constant.

When the magnitude of leak is changed depending upon the sum of the absolute values of the tap gains [$|1-c_0|$ (more generally, $|p_0-c_0|$) is employed instead of $|c_0|$ for the main tap] according to the above-described manner, the magnitude of leak may become large to prevent divergence when the input waveform has a great distortion. When the distortion in the input waveform is small, and the value of leak necessary to avoid the divergence is also small, a small leak is added, thereby minimizing the residual distortion.

It should be understood that the above-described manner of deciding the value of the leak ($\beta$, $l$ or a) is only an example. Therefore, any method which comprises changing the value of the leak on the basis of the sum of the absolute value of the tap gains (or more exactly, the sum of the absolute values of the differences between the previously determined values and the tap gains) is included in the scope of the present invention.

In addition, it is optional for the correlation expressed by equation (1) between the input and error waveforms, or the error waveform itself to be employed as tap gain correction information, and various kinds of modifications may be derived therefrom.

Further, the basic arrangement of the automatic equalizer of the present invention may be either of a nonrecursive connection type as shown in FIG. 2, or of a recursive connection type.

The present invention is effective in a circuit arrangement of so-called ghost cancelling mode in which the main tap $c_0$ is fixed to 1 and in which $c_{-M} - c_{-1}$ and $c_1 - c_L$ (L ranging from 5 to 10, for example) are fixed to 0 in FIG. 2.

Furthermore, the tap gain correcting circuit 47 in the embodiment shown in FIG. 2 is not limited to the combination of the circuit blocks shown in FIG. 2. The same function can also be realized by a software of a microprocessor, for example, to which the present invention can be applied.

The magnitude of leak is found on the basis of the sum of the absolute values of all the tap gains in the above embodiment. Where some amount of distortion is allowed, however, it is not necessary to find the sum of the absolute values of all the tap gains. The absolute value $|c_0-p_0|$ for the main tap, and the absolute value $|c_i-P_i|$ for the others have same weight in achieving automatic equalization. In a case where the absolute value is calculated with respect to the tap gains whose number is smaller than that of the taps, it does not necessarily require to consider the absolute value $|c_0-p_0|$ for the main tap. Also in this case, a leak which corresponds to the sum of the absolute value calculated with respect to the other tap gains is also applied to the gain control operation of the main tap.

What is claimed is:

1. An automatic equalizer including a waveform equalizer having a transversal filter connected to receive an input signal in which a waveform of a predetermined shape is periodically present, and having a plurality of taps whose gains can be controlled; and a tap gain correcting means for successively correcting each of the tap gains of said transversal filter in such a way that an output waveform of said waveform equalizer circuit, which corresponds to the waveform of the predetermined shape present in the input signal, approaches a predetermined reference waveform, said tap gain correcting means being arranged to add a leak to the tap gain control so that each of the tap gains of said transversal filter approaches its desired value, characterized in that said tap gain correcting means is arranged to find the sum of absolute values of differences between the tap gains of a plurality of taps of said transversal filter and predetermined values of the corresponding tap gains set when the input signal contains no distortion, and to change the magnitude of leak to be added to the tap gain control in accordance with the sum of absolute values.

2. An automatic equalizer according to claim 1, wherein said transversal filter has a main tap, and the predetermined tap gain of the main tap is unity and that of each of the other taps is zero.

3. An automatic equalizer according to claim 1, wherein said tap gain correcting means is arranged to find the sum of absolute values of the tap gain differences with respect to all the taps of said transversal filter.

* * * * *